United States Patent [19]  
Krude

[11] Patent Number: 4,516,959  
[45] Date of Patent: May 14, 1985

[54] SEALING BOOT FOR UNIVERSAL JOINT

[75] Inventor: Werner Krude, Siegburg-Kaldauen, Fed. Rep. of Germany

[73] Assignee: Uni-Cardan Aktiengesellschaft, Fed. Rep. of Germany

[21] Appl. No.: 466,523

[22] Filed: Feb. 15, 1983

[30] Foreign Application Priority Data

Feb. 20, 1982 [DE] Fed. Rep. of Germany ....... 3206127

[51] Int. Cl.³ ................................................. F16D 3/84
[52] U.S. Cl. ............................... 464/175; 277/212 FB
[58] Field of Search ................. 277/212 FB; 464/143, 464/145, 146, 173, 175, 906

[56] References Cited

U.S. PATENT DOCUMENTS

| | | | |
|---|---|---|---|
| 4,094,376 | 6/1978 | Welschof | 464/175 X |
| 4,132,422 | 1/1979 | Sankey et al. | 277/212 FB |
| 4,240,680 | 12/1980 | Krude et al. | 464/173 X |
| 4,262,498 | 4/1981 | Krude et al. | 464/145 |
| 4,360,209 | 11/1982 | Ukai et al. | 464/175 |
| 4,392,838 | 7/1983 | Welschof et al. | 464/175 |

FOREIGN PATENT DOCUMENTS 6809359 11/1968 Fed. Rep. of Germany .

Primary Examiner—Stuart S. Levy  
Assistant Examiner—Daniel P. Stodola  
Attorney, Agent, or Firm—Toren, McGeady, Stanger, Goldberg & Kiel

[57] ABSTRACT

In a universal joint, the inner joint member thereof is connected with one end of an intermediate element, with the other end of the intermediate element receiving an end of a sealing boot to enable the sealing boot to stretch over the outer joint member and to be firmly and tightly connected to a driveshaft and to the intermediate element in order to provide a safe sealing function which forms an enclosed system with connections which may be freely designed without limitation as to the adjoining components, the intention being to obtain a unit having the shortest possible axial length without restricting the angular articulation and axial mobility of the joint.

1 Claim, 3 Drawing Figures

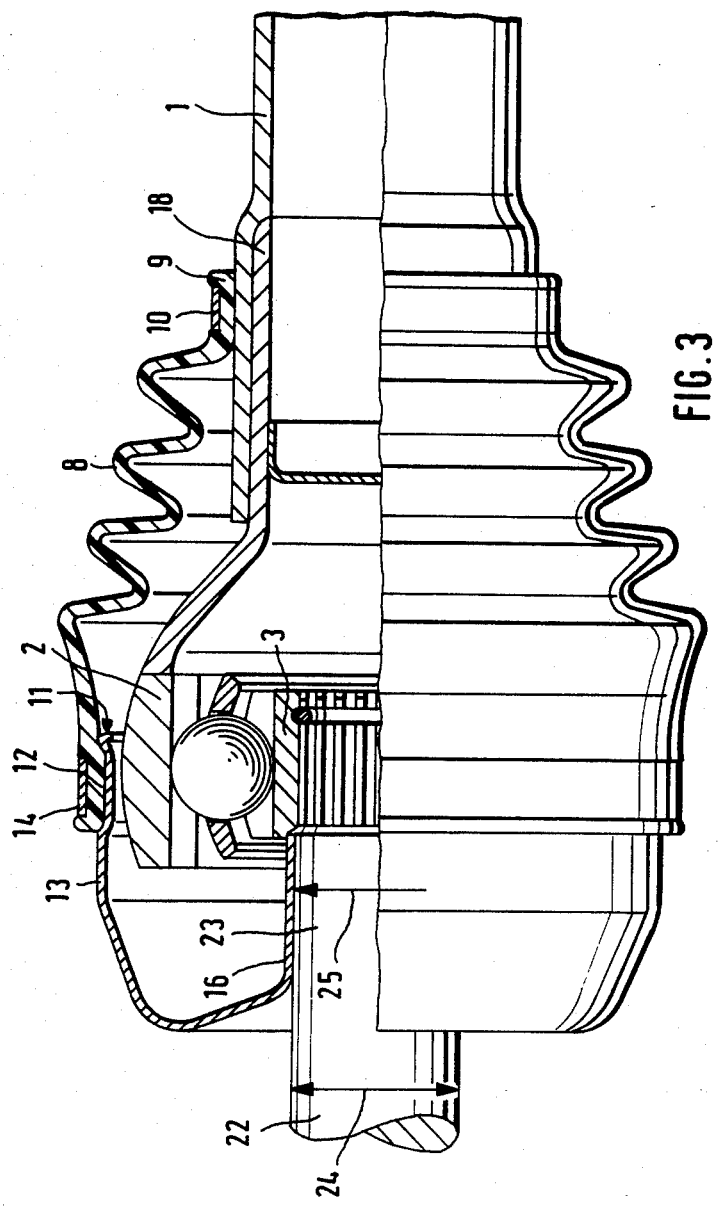

SEALING BOOT FOR UNIVERSAL JOINT

The present invention relates generally to universal joints and more particularly to a sealing boot made of an elastic material for such rotating universal driving joints.

Joints of the type to which the invention relates include an outer and an inner joint member, with the sealing boot end having the smaller diameter being firmly and tightly connected to the drive shaft connected to the joint and with the sealing boot end having the larger diameter sealing the joint interior. The outer and inner joint members are angularly- or angularly-and-axially movable relative to each other and the outer joint member is connected to the drive shaft.

With such a design the sealing boot will bridge the entire free space between the driving part, e.g., the outer joint member and the driven part, e.g., the inner joint member and it is therefore subjected to the entire relative movement.

Sealing boots for sealing rotary CV joints are known, for example, in German Utility Model No. 68 09 359, in the case of which the larger diameter end of the boot is connected to the outer joint member by means of a clip and a clip is also used to seal the smaller diameter on the driveshaft. However, the disadvantage of these designs is that an axially longer space is required and that lubricating grease cannot be filled in until the shaft in question is assembled. Subsequently, the system is fully sealed by means of the clips. In addition, when designing the boot, the connections to the neighboring components must always be taken into account in order to ensure a connection between the parts by providing the required shapes.

It is therefore the object of the invention to provide a safe sealing boot which represents a complete system in itself and whose connections can be designed freely without considering the adjoining components. In addition, it is intended to provide a unit with the shortest possible axial length without restricting the articulation ability and axial movability of the joint.

SUMMARY OF THE INVENTION

Briefly, the present invention may be described as a universal joint comprising: an inner joint member and an outer joint member arranged to be angularly movable relative to each other; a drive shaft connected in driving engagement with said outer joint member; a sealing boot made of resilient material for sealing the interior of said joint having a first end formed with a smaller diameter and a second end formed with a larger diameter; and an intermediate element having one end connected with said inner joint member and another end receiving said sealing boot; said sealing boot being arranged with said first smaller diameter end connected with said drive shaft and with said second larger diameter end connected in said joint so that said sealing boot stretches over said outer joint member and is tightly connected to said drive shaft and to said intermediate element.

The principal objectives of the invention are therefore achieved in that:

(a) the inner joint member is connected to one end of the intermediate element and the other end of the intermediate element receives the sealing boot; and (b) the sealing boot stretches over the outer joint member and is firmly and tightly connected to the driveshaft and the intermediate element.

The advantage of the above design is that the entire unit requires only a short axial space and that an enclosed system can be obtained which can be filled with lubricants before it is assembled, for example, in a vehicle. There is also a greater degree of freedom available in designing the sealing boot as the components to be connected need not be taken into account. In addition, it is possible to achieve a double seal because it is not only possible to provide the folds of the sealing boot but also a contact seal on the outer circumference of the outer joint member.

According to a further essential feature, the intermediate element increases the clamping diameter of the sealing boot beyond the diameter of the bore of the inner joint member or the intermediate shaft.

Such a design is particularly advantageous in the transverse driveshafts of a motor vehicle where the diameter of the output shaft is smaller than the outer joint member of the joint. In such systems the sealing boot may be provided with an optimum design in accordance with the kinematic requirements of the joint as the boot itself is stretched across the outer joint member where it has its area of operation. The adjoining components do not adversely affect the mode of operation of the seal for the actual joint.

Provision has also been made for the intermediate element to be connected to the inner joint member preferably directly in the bore of the inner joint member or indirectly via a pin.

Depending on the design, it is possible for the inner joint member to be provided with a bore into which a pin of the adjoining components can be inserted so that the intermediate element is received in the bore, or there may be embodiments in the case of which the inner joint member has already been provided with a pin for insertion into a bore of the adjoining component, with the intermediate element also being capable of quite easily being connected to the pin.

Furthermore, provision has been made for the inner diameter of the intermediate element to be approximately identical to the outer diameter.

In order to provide a short unit, a further feature provides for the receiving seat designed for receiving the sealing boot to be aligned toward the joint.

According to a further feature of the invention, the outer joint member is movable relative to the receiving seat.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 3 is a section of a plunging or axially movable joint with a sealing boot.

DETAILED DESCRIPTION OF THE PREFERRED EMBODIMENTS

Figure 1:
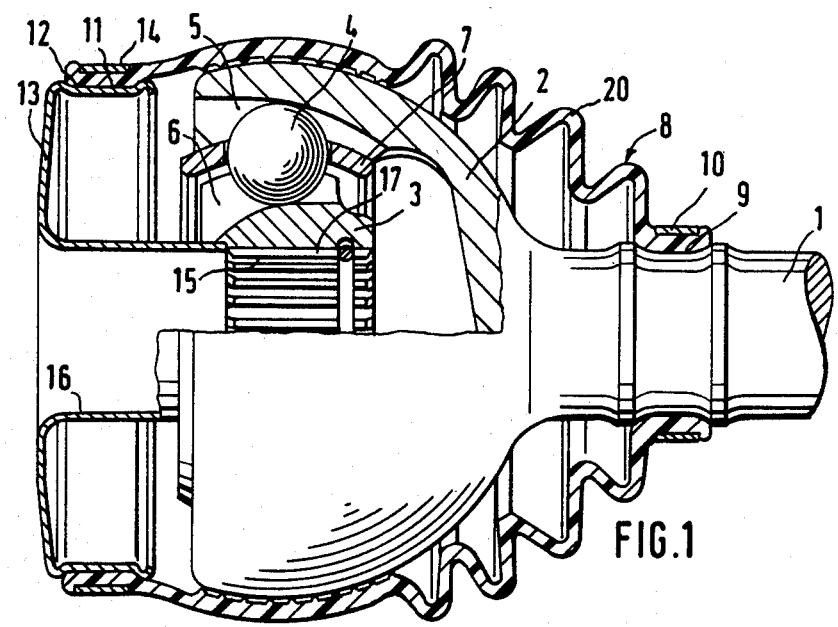
FIG. 1 is a section of a joint having a sealing boot.

A universal joint in accordance with the present invention is illustrated in FIG. 1 and is shown to essentially consist of a driveshaft 1 and an outer joint member 2 in whose interior an inner joint member 3 is accommodated. Between the outer joint member 2 and the inner joint member 3, balls 4 are received in grooves 5 of the outer joint member 2 and in grooves 6 of the inner joint member 3 for torque-transmitting purposes. A cage 7 serves to hold the balls 4.

In order to seal the joint interior, provision has been made for a sealing boot 8 having folds 20 and a smaller fixing diameter 9 which is held on the driveshaft 1 by means of a tensioning strip 10. At the opposite end, a larger fixing diameter 11 of the sealing boot 8 is fixed to a receiving seat 12 of an intermediate element 13 via a tensioning strip 14. The intermediate element 13 is firmly connected to the inner joint member 3 in its bore 15 in a fixed manner. The inner diameter of a cylindrical part 16 of the intermediate element 13 is slightly greater than the bore 15 of the inner joint member 3 in order to permit a connecting shaft or pin (not shown) to be received in the splines 17 of the inner joint member 3 in a rotatively fixed manner.

Figure 2:
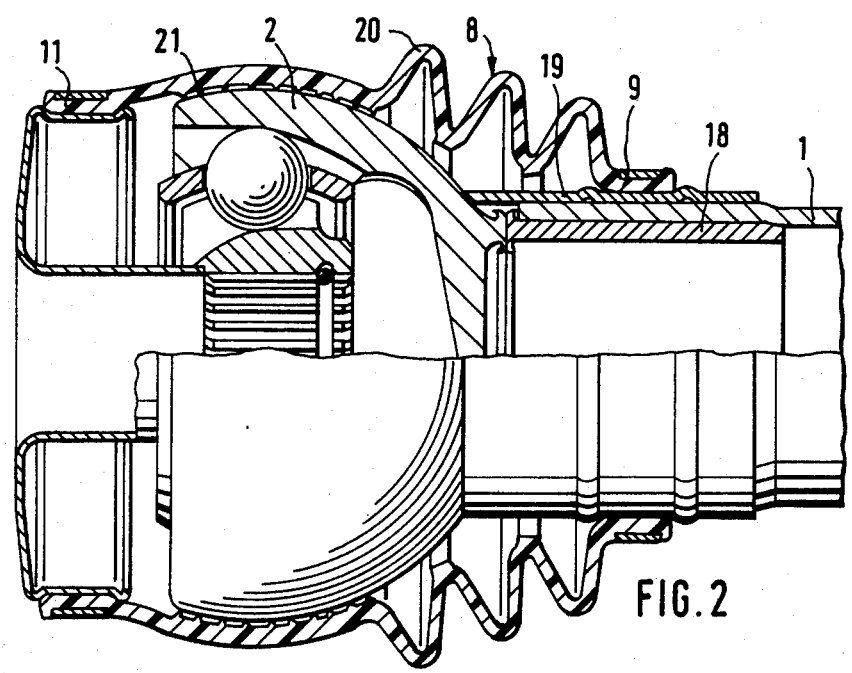
FIG. 2 is a section of a further sealing boot illustrated in principle as in FIG. 1, with the difference being that it is connected to a shaft of lightweight design.

FIG. 2 also shows a driveshaft 1 which is connected to an outer joint member 2, the difference being that the driveshaft 1 is received on a projection 18 of the outer joint member 2 and is rotatively fixed through an additional sleeve. The smaller diameter 9 of the sealing boot 8 is fixed to a sleeve 19. Otherwise, the principle is as illustrated in FIG. 1. Between the large fixing diameter 11 and the actual folds 20, the sealing boot 8 has additionally been provided with sealing lips 21 which operate as an additional contact seal on the outer faces of the outer joint member 2.

FIG. 3 shows a further embodiment of a joint in accordance with the invention in the case of which the outer joint member 2, relative to the inner joint member 3, is received so as to be movable in the axial direction. With this plunging joint, the intermediate element 13 is also connected to the inner joint member 3 and, via a receiving seat 12, the sealing boot 8 is again connected to the intermediate element 13 by means of a tensioning strip 14. The small fixing diameter 9 of the sealing boot 8 is fixed to the driveshaft 1. In the case of a plunging joint, such a sealing boot 8 must accommodate articulations as well as axial movements.

The embodiment of FIG. 3 is also provided with a connecting pin 22 which is formed with a cylindrical part 23 having an outer diameter 24 which is slightly larger than an inner diameter 25 of a cylindrical part 16 of the intermediate element 13. As shown in FIG. 3, the connecting pin 22 is fitted within the cylindrical part 16 of the intermediate element 13.

Thus, it will be seen that the present invention provides a safe sealing boot which in itself forms an enclosed system and the connections of which may be designed freely without having to take into account the adjoining components. In addition, it is the intention to obtain a unit whose axial length is as short as possible without restricting the articulation ability and axial movability of the joint.

This objective is achieved in that the inner joint member 3 is connected to one end of an intermediate element 13 and that the other end of the intermediate element 13 receives the sealing boot 8 and that the sealing boot 8 stretches over the outer joint member 2 and is firmly and tightly connected to the shaft 1 and the intermediate element 13.

While specific embodiments of the invention have been shown and described in detail to illustrate the application of the inventive principles, it will be understood that the invention may be embodied otherwise without departing from such principles.

What is claimed is:

1. A universal joint comprising:
   an inner joint member and an outer joint member arranged to be angularly movable relative to each other;
   a driveshaft connected in driving engagement with said outer joint member;
   a sealing boot made of resilient material for sealing the interior of said joint having a first end formed with a smaller diameter and a second end formed with a larger diameter;
   an intermediate element formed as a member bent upon itself shaped to define an inner annular part and an outer annular part which are radially overlapping, said outer annular part having a diameter larger than said inner annular part and extending thereabout generally concentrically therewith;
   a pin member extending from said inner joint member having said inner annular part of said intermediate element mounted thereon for connecting said intermediate element with said inner joint member;
   said inner annular part having a diameter engaging said pin member with a press fit;
   said sealing boot being arranged with said first smaller diameter end connected with said driveshaft and with said second larger diameter end connected about said outer annular part of said intermediate element so that said sealing boot stretches over said outer joint member and is tightly connected to said driveshaft and to said intermediate element;
   said outer annular part of said intermediate element being formed with a diameter which extends outwardly of and radially about said outer joint member and being shaped to comprise a receiving seat provided for receiving said second larger diameter end of said sealing boot, said receiving seat being directed toward said joint.

* * * * *